Oct. 6, 1942.  E. HOOD  2,297,960
WHEEL HUB FOR VELOCIPEDES
Filed Nov. 4, 1939  2 Sheets-Sheet 1
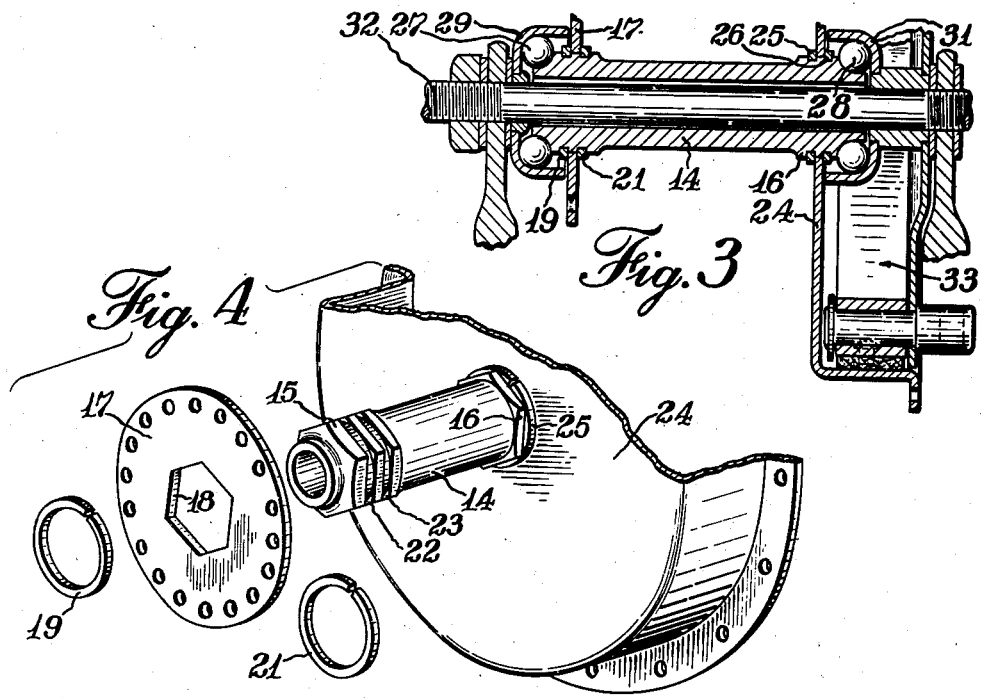
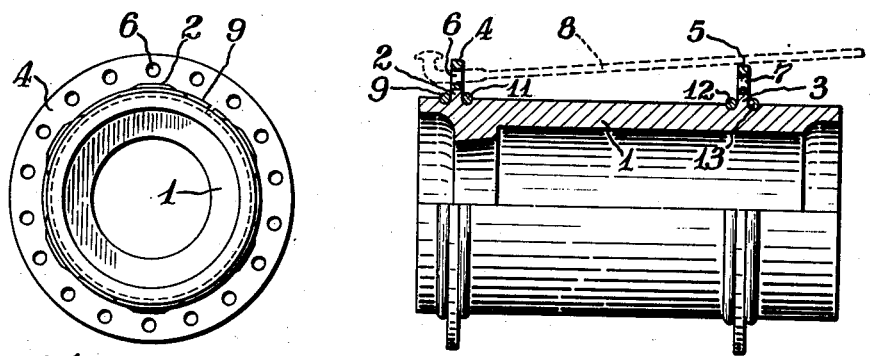
INVENTOR.
E. Elliott Hood Oct. 6, 1942.         E. HOOD         2,297,960
WHEEL HUB FOR VELOCIPEDES
Filed Nov. 4, 1939         2 Sheets-Sheet 2

Witness:
Burr W. Jones

INVENTOR.
E. Elliott Hood
BY
ATTORNEY.

Patented Oct. 6, 1942

2,297,960

UNITED STATES PATENT OFFICE 2,297,960

WHEEL HUB FOR VELOCIPEDES

E. Elliott Hood, Elmira, N. Y., assignor to Bendix Aviation Corporation, South Bend, Ind., a corporation of Delaware Application November 4, 1939, Serial No. 302,912

3 Claims. (Cl. 301—105)

The present invention relates to wheel hubs for velocipedes and the like and more particularly to hubs for wheels having wire spokes attached under tension to the hub and rim.

In wheels of this type it is customary to form the hub with radial flanges near its ends which are perforated to receive the hooked ends of the spokes. When the wheel is assembled, the spokes are laced through the holes in the spoke flanges of the hub, and the threaded ends of the spokes inserted in nipples located circumferentially in the wheel rim, the nipples being tightened until the spokes are placed under suitable tension and the hub held thereby concentrically in the wheel rim.

It will be readily appreciated that the operation of thus properly lacing up a bicycle wheel so as to have the hub concentric with the rim and the spokes approximately under uniform tension requires considerable skill and judgment and for an inexperienced person constitutes a tedious process.

Since the bearing cups of bicycle hubs and the clutch and brake surfaces of coaster brakes are commonly made integral with the hub, it will be seen that the replacement of these parts which are subject to wear means the substitution of a new hub, and this entails unlacing the old hub and lacing in the new one. Moreover, in certain types of hubs in which the hub flanges are of different diameters, such as those employing a band brake structure internally of the hub, it is sometimes difficult to insert the spokes in the smaller flange without bending the spokes to an undesirable extent in order to get them past the larger flange.

It is customary to provide bicycle hubs with a bright metal finish by electroplating and burnishing, but when hubs are manufactured in the usual way with spoke flanges formed integrally therewith, it is difficult to secure a uniform deposit of the plating metal, and thorough burnishing is necessarily a hand operation.

It is an object of the present invention to provide a novel wheel hub which is strong and rigid in construction and which may be easily and quickly assembled in its wheel.

It is another object to provide such a device in which the parts subject to wear may be removed and replaced without the necessity of unlacing and lacing up the wheel.

It is a further object to provide such a device in which the spoke flanges are made separable from the body of the hub whereby the spoke flanges and hub body may be plated and finished efficiently and economically prior to assembly thereof. Moreover, after the hub has been assembled in the wheel, the hub body may be removed from the wheel while the spoke flanges remain laced therein.

It is another object to provide such a device incorporating a rigid mounting for the spoke flanges on the hub body, which mounting is readily disconnectable to permit removal of the hub body from the wheel.

Further objects and advantages will be apparent from the following description taken in connection with the accompanying drawings in which:

Fig. 1 is a side elevation partly in section of the hub barrel of a coaster brake embodying a preferred form of the present invention;

Fig. 2 is an end view thereof;

Fig. 3 is a longitudinal sectional view partly broken away of a wheel hub incorporating an internal expanding brake constructed according to the present invention, parts being broken away;

Fig. 4 is an exploded view in perspective of the hub barrel, brake drum and spoke flanges of the embodiment of the invention illustrated in Fig. 3;

Figure 5:
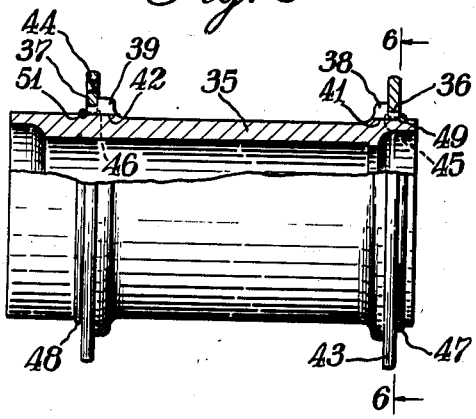
Fig. 5 is a side elevation partly broken away of another embodiment of the invention.

In Fig. 1 of the drawings there is illustrated a hub barrel 1, the interior of which is formed in conventional manner to house and cooperate with the parts, not illustrated, of any suitable form of coaster brake mechanism.

According to the present invention, polygonal seats 2 and 3 are formed on the exterior surface of the hub barrel 1 adjacent the ends thereof. It will be understood that these seats will preferably be formed by the use of suitable polygonal bar or tubular stock for the hub, the exterior surface of which is turned down to cylindrical form except where the polygonal seats 2 and 3 are left.

Spoke flange members are provided in the form of annuli 4 and 5 having a circular series of openings 6 and 7 therein for the reception of spokes such as indicated in dotted lines at 8. The spoke flanges are formed with internal polygonal surfaces adapted to conform to the polygonal seats 2 and 3 of the hub barrel and fit snugly thereon. Readily detachable means for maintaining the spoke flanges in position upon the seats 2 and 3 are provided in the form of split rings 9, 11 and 12, 13 seated in grooves in the exterior of the hub 1 on each side of the spoke flanges.

It will be appreciated that the plating and burnishing of these parts prior to assembly may be effectively carried out by economical methods without the necessity of individual manipulation.

In assembling the structure constructed as above set forth, the spoke flanges are preferably mounted on the seats 2 and 3 of hub barrel 1 and retained thereon by the split lock rings prior to lacing the flanges in the rim. The spokes are then inserted through the openings in the hub flanges and the wheel laced up in the usual manner.

When it becomes necessary to replace the wearing parts of the hub, it is merely necessary to remove the locking rings, whereupon the hub barrel 1 may be slipped out of the wheel and replaced by a new hub barrel without disturbing the lacing of the spoke flanges in the wheel rim.

In the structure illustrated in Figs. 3 and 4, a hub barrel 14 is provided with hexagonal prismoidal portions 15 and 16 near its ends. A spoke flange 17 having a hexagonal opening 18 is mounted on the prismoidal portion 15 of the hub and is retained thereon against longitudinal movement by locking rings 19 and 21 mounted in grooves 22 and 23 in said prismoidal portion.

A combined brake drum and spoke flange member 24 having a hexagonal opening therein is mounted on the prismoidal portion 16 of the hub and retained thereon by locking rings 25, 26 in a similar manner to the spoke flange 17.

The hub barrel 14 is rotatably mounted by means of bearing balls 27 and 28 in bearing cups 29, 31 which are adjustably mounted on a fixed axle 32. Suitable brake mechanism 33 is mounted on the axle 32 within the drum member 24 to cooperate therewith in any conventional manner.

In assembling this hub structure in a wheel, it will be seen that by reason of the large diameter of the brake drum and spoke flange member 24, it would be difficult to insert the spokes in the openings of the small spoke flange 17 without undesirably bending the spokes. In the present structure, however, it is obvious that the spokes may be inserted in the flange member 17 before the latter is mounted on the hub barrel 14, after which the hub may be laced into the rim of the wheel in the usual manner. This structure also provides the replacement feature above set forth in connection with the embodiment of the invention first described since the hub barrel 14 may be removed from the spoke flanges 17, 24 and replaced by a new hub barrel while said flanges remain laced into the wheel rim.

It will be appreciated that the polygonal shape of the conforming surfaces of the hub barrel and spoke flanges is merely one preferred form of rigid torque transmitting connection therebetween and that other forms of connection and locking means may be used.

Figure 6:
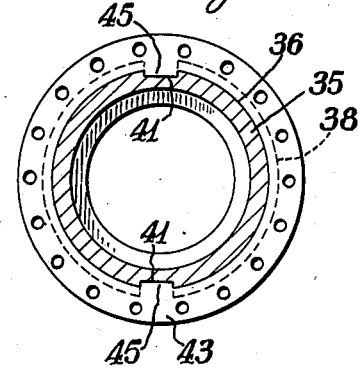
Fig. 6 is a section taken substantially on the line 6—6 of Fig. 5.

Figs. 5 and 6 illustrate an embodiment of the invention in which the torque transmitting connection between the hub barrel and spoke flanges is formed by means of a plurality of lugs on the spoke flanges extending into longitudinal grooves in the hub. As shown in Fig. 5, the hub barrel 35 is provided with cylindrical seats 36 and 37 adjacent its ends, with abutment shoulders 38 and 39 located inwardly thereof. Longitudinal grooves 41 and 42 are formed in the seats 36 and 37 and shoulders 38, 39.

Spoke flanges 43 and 44 are mounted on the seats 36 and 37 and are provided with keying lugs 45 and 46 which enter the grooves 41 and 42 in the seats to transmit torque between the hub barrel and spoke flanges. Lock rings 47 and 48 seated in circumferential grooves 49 and 51 maintain the spoke flanges seated against the shoulders 38 and 39.

Figure 7:
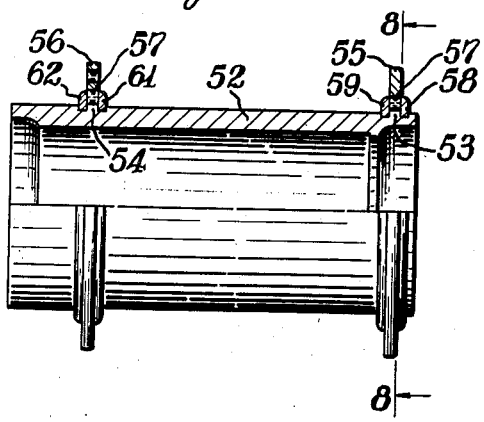
Fig. 7 is a side elevation partly in section of another embodiment of the invention.
Figure 8:
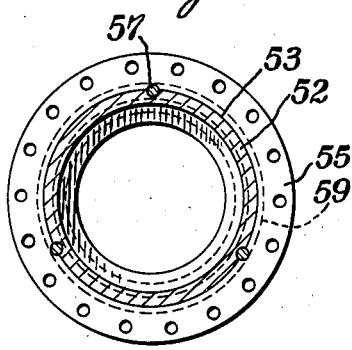
Fig. 8 is a section taken substantially on the line 8—8 of Fig. 7.

In Figs. 7 and 8 there is shown an embodiment of the invention which comprises a hub barrel 52 formed externally as a smooth cylinder provided with circular seat flanges 53 and 54 adjacent the ends thereof. Spoke flanges 55 and 56 are located on said seats and are prevented from rotation thereon by means of keys in the form of pins 57 (Fig. 8) which occupy registering semicylindrical recesses in the spoke flanges and seats. Locking rings 58, 59 and 61, 62 are seated in circumferential grooves in the hub barrel for maintaining the spoke flanges 55 and 56 on their seats.

Although certain embodiments of the invention have been shown and described in detail, it will be understood that other embodiments are possible and various changes may be made in the design and arrangement of the parts without departing from the spirit of the invention as defined in the claims appended hereto.

What is claimed is:

1. In a wire wheel hub for velocipedes and the like, a substantially cylindrical hub body having bearing members at its ends, seats of non-circular cross section formed on said body adjacent its ends, removable spoke flanges slidable freely on said seats and conforming thereto, and removable abutment means for preventing longitudinal movement of the flanges from said seats, the minimum diameter of the seats being greater than the outside diameter of the remainder of the hub, so that removal of the abutment means permits the hub to be slid longitudinally through the spoke flanges while they are laced in the wheel.

2. In a wheel hub for velocipedes and the like, a substantially cylindrical hub body having bearing members at its ends, seats of generally polygonal cross section formed on said body adjacent its ends, removable spoke flanges slidably mounted on said seats and conforming thereto, said hub having circumferential grooves adjacent said seats, and removable abutment rings seated in said grooves maintaining the flanges on said seats.

3. In a wheel hub for velocipedes or the like, a cylindrical hub barrel having bearing races formed integrally at its ends and having polygonal portions adjacent thereto, discs having polygonal central openings slidably mounted on said polygonal portions and having peripherally arranged spoke receiving openings, said hub barrel having peripheral grooves in said polygonal portions, and split abutment rings in the grooves preventing longitudinal movement of the discs.

E. ELLIOTT HOOD.